Sept. 26, 1944.  A. H. FECHNER  2,359,099
WHEEL PULLER
Filed Dec. 24, 1943
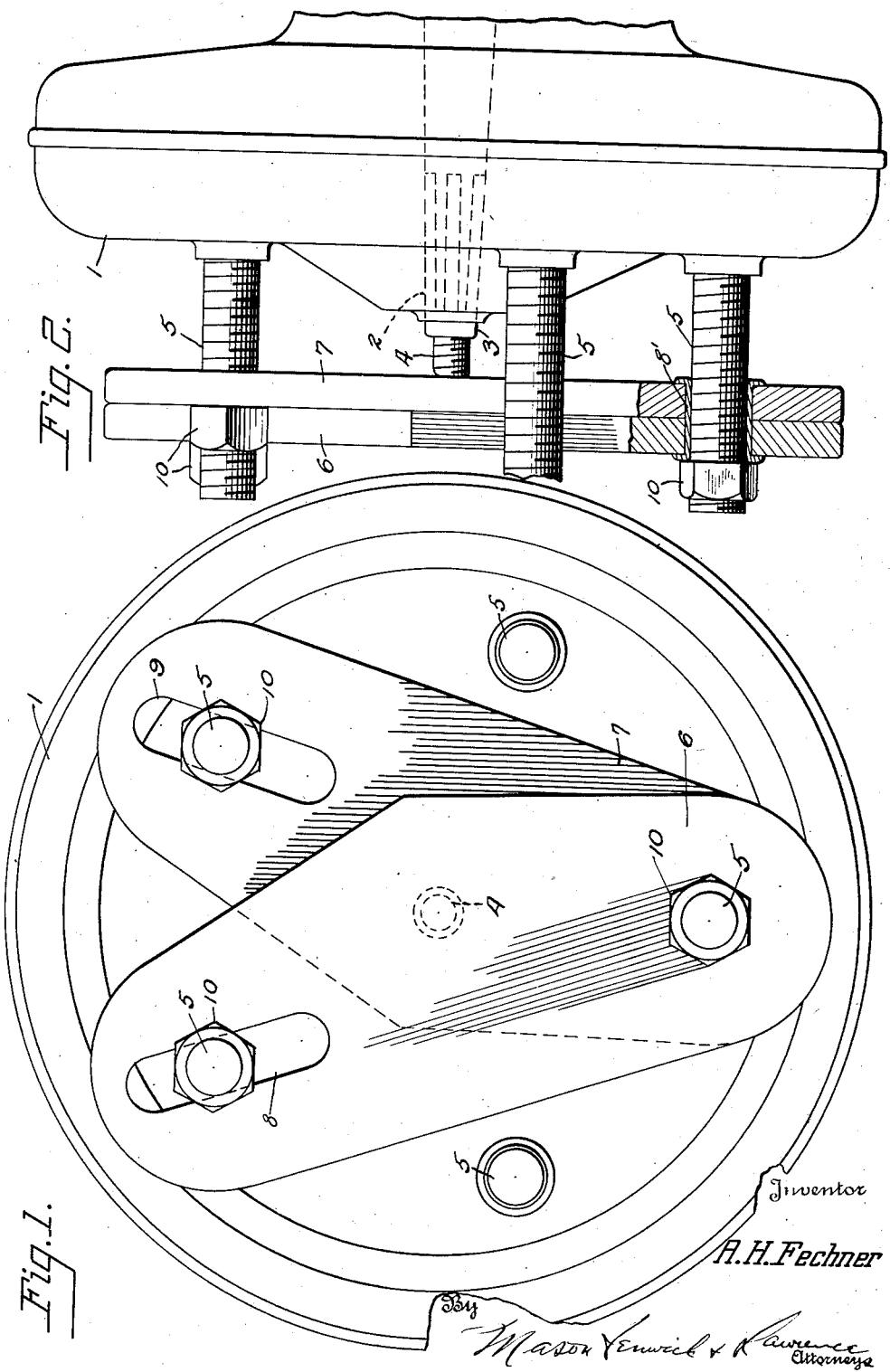

Patented Sept. 26, 1944

2,359,099

UNITED STATES PATENT OFFICE 2,359,099

WHEEL PULLER

Albert H. Fechner, Houston, Tex.

Application December 24, 1943, Serial No. 515,572

3 Claims. (Cl. 29—270)

This invention relates to a wheel hub remover of the impact type, particularly adapted for the removal of the hub drums of demountable wheels of auto-vehicles.

One of the objects of the invention is to provide a device of the character described, designed to be secured to the wheel hub drum after removal of the wheel, by any three of the wheel retaining stud nuts or bolts which define a triangular area overlying the axle, and in engagement with the end of the axle, and when so secured to be struck by a sledge over its point of engagement with the axle, whereby the wheel hub drum is dislodged from the axle.

Another object of the invention is to provide a wheel hub remover as described, consisting of a pair of flat, rigid elongated leaf members hinged at one end, adapted to be divergently spread for use and to be closed into a position of substantial congruency when not in use, having a common aperture through their lapped hinged end, and longitudinal slots in their free ends, whereby they may be adjusted to register with studs of different angular displacement or at different radial distances from the axle, thus making the device universally adaptable for all auto-vehicles with demountable wheels.

A further object of the invention is to provide the hinge connection between the leaves, in the form of a hollow pivot adapted to slip over one of the studs or to be entered by one of the bolts of the wheel hub drum, as the case may be. This hollow pivot also affords means for suspending the device from a nail or strap, in closed condition, when not in use.

Still another object of the invention is to make the leaves of such width that they both overlie the axle end when in operating position, thus stiffening the device, providing double strength at the point of impact, and increasing its efficiency of operation.

Other objects of the invention will appear as the following description of a preferred and practical embodiment thereof proceeds.

In the drawing which accompanies and forms a part of the following specification and in which similar reference characters have been employed to denote identical parts:

Figure 1 is a side view in elevation, showing the hub drum with the hub drum remover of the present invention operatively secured thereto;

Figure 2 is a side view partly in section.

Referring now in detail to the several figures, the numeral 1 represents the wheel hub drum, which as illustrated, has a tapered socket 2 fast to the correspondingly tapered end 3 of the axle 4 by means of the usual spline connection. Studs 5 are fixed to the wheel hub drum 1 in a circular series concentric with the axle 4, as is customary in the art. In certain makes of automobiles, these studs are substituted by bolts, not shown. The studs, as shown, are five in number, spaced at equal angular intervals, but in some auto-vehicles there are six studs. In various makes of cars the wheel retaining means are at different radial distances from the axle. The construction of the wheel hub remover of the subject invention is such as to adapt it to use with all of the variations in the number, radial distance, and type of wheel retaining means employed in various makes of auto-vehicles.

Referring particularly now to the wheel drum remover per se, it comprises a pair of flat substantially rigid leaf members 6 and 7, preferably of metal, hingedly connected at one end in lapping relation by the hollow pivot 8'. The aperture through said pivot is large enough to receive one of the studs 5. The opposite ends of the leaf members 6 and 7 are provided with the longitudinal slots 8 and 9, each adapted to receive a stud 5 on the opposite side of the axle 4. The leaf members by virtue of their hinged connection are adapted to be adjustably spread to register the slots 8 and 9 with the corresponding studs 5, regardless of the angular displacement of said studs, and the longitudinal disposition of the slots 8 and 9 enable them to receive said studs, irrespective of the radial distance of said studs from the axle.

The wheel hub drum remover is slipped over the studs, as shown in Figures 1 and 2, and the nuts 10, which normally secured the demountable wheels, are screwed against the leaves of the hub drum remover so as to bring its middle portion into tensioned engagement with the end of the axle 4.

It is to be observed that the width of the leaf members 6 and 7 is such that when they are in spread, operative position, both leaves overlie the end of the axle, providing great strength at this point, and since they are inherently lapped from their hinged connection to a point beyond the axle on the opposite side to said hinged connection, this contributes greatly to the strength and rigidity of the device.

When the hub drum remover is in tensioned contact with the axle 4, it is struck by a sledge in the region which overlies the axle, the result of the impact blow being to loosen the joint between the wheel hub drum and axle, permitting its free removal.

The leaf members 6 and 7 are preferably of the same shape, and so formed that when not in use they can be brought together into a relation of substantial congruency, thus reducing the device to a small compass.

The aperture, through the pivot, affords means for suspending the device from a nail or by a strap extending through the hollow pivot.

While I have in the above description disclosed what I believe to be a preferred and practical embodiment of my invention, it will be understood to those skilled in the art that the specific details of construction and arrangement of parts are by way of illustration and not to be construed as limiting the scope of the invention which is defined in the appended claims.

What I claim as my invention is:

1. Wheel hub remover for auto-vehicles of the demountable wheel type in which a series of wheel retaining bolts or studs are spaced about an axle comprising a pair of substantially rigid lapped leaves, hinged adjacent one end, having a common aperture therethrough at the hinged end adapted to receive one of the wheel retaining means, said leaves being provided with longitudinal slots in their free ends, each adapted to receive another of the wheel retaining means, said leaves being of such width as to lap in the region which overlies the end of the axle when the wheel hub remover is in operative position.

2. Wheel hub remover for auto-vehicles of the demountable wheel type in which a series of wheel retaining bolts or studs are spaced about an axle comprising a pair of substantially rigid lapped leaves, hinged adjacent one end, having a common aperture therethrough at the hinged end adapted to receive one of the wheel retaining means, said leaves being of substantially identical shape and being formed to lap substantially congruently when in closed position, said leaves being provided with longitudinal slots in their free ends, each adapted to receive another of the wheel retaining means, said leaves being of such width as to lap in the region which overlies the end of the axle when the wheel hub remover is in operative position.

3. Wheel hub remover for auto vehicles of the demountable wheel type in which a series of wheel retaining bolts or studs are spaced about an axle, comprising a pair of substantially rigid lapped leaves, a hollow pivot hingedly joining said leaves at one end adapted to receive one of the wheel retaining means, said leaves being each provided with a longitudinal slot at its free end to receive another of the wheel retaining means, said leaves being of such width as to lap in the region overlying the axle when said wheel hub remover is in operative position.

ALBERT H. FECHNER.